United States Patent

[11] 3,598,055

| | | |
|---|---|---|
| [72] | Inventor | Dennis E. Gunderson<br>Alexandria, Va. |
| [21] | Appl. No. | 772,330 |
| [22] | Filed | Oct. 31, 1968 |
| [45] | Patented | Aug. 10, 1971 |
| [73] | Assignee | The United States of America as represented by the Secretary of the Army |

[54] CAPACITIVE DISCHARGE FUZE
1 Claim, 1 Drawing Fig.

| [52] | U.S. Cl. | 102/70.2 |
|---|---|---|
| [51] | Int. Cl. | F42c 15/40 |
| [50] | Field of Search | 102/7, 16, 70.2, 81; 317/80; 114/206.1 |

[56] References Cited
UNITED STATES PATENTS

| 3,170,433 | 2/1965 | Gardiner | 114/206.1 |
| 3,225,695 | 12/1965 | Kapp et al. | 102/70.2 |

*Primary Examiner*—Verlin R. Pendegrass
*Attorneys*—Harry M. Saragovitz, Edward J. Kelly, Herbert Berl and Glenn S. Ovrevik ABSTRACT: This invention relates to a fuzing device and, more particularly, to a capacitive discharge fuze for an explosive embedment anchor. This fuze device makes use of a battery, the voltage of which is in excess of the maximum working voltage of the capacitor, to reduce the charging time to an acceptable minimum. A first switch connects the battery to the capacitor. A Zener diode acting in conjunction with a silicon controlled rectifier and a replaceable fuse element control the charging of the capacitor. At the rated voltage of the capacitor, the Zener diode triggers the silicon controlled rectifier causing a short circuit through the fuse element across the capacitor. The excessive current through the short circuit path melts and permanently opens the fuse element thereby permanently isolating the charged capacitor from the charging circuit. A second switch discharges the capacitor through a detonator.

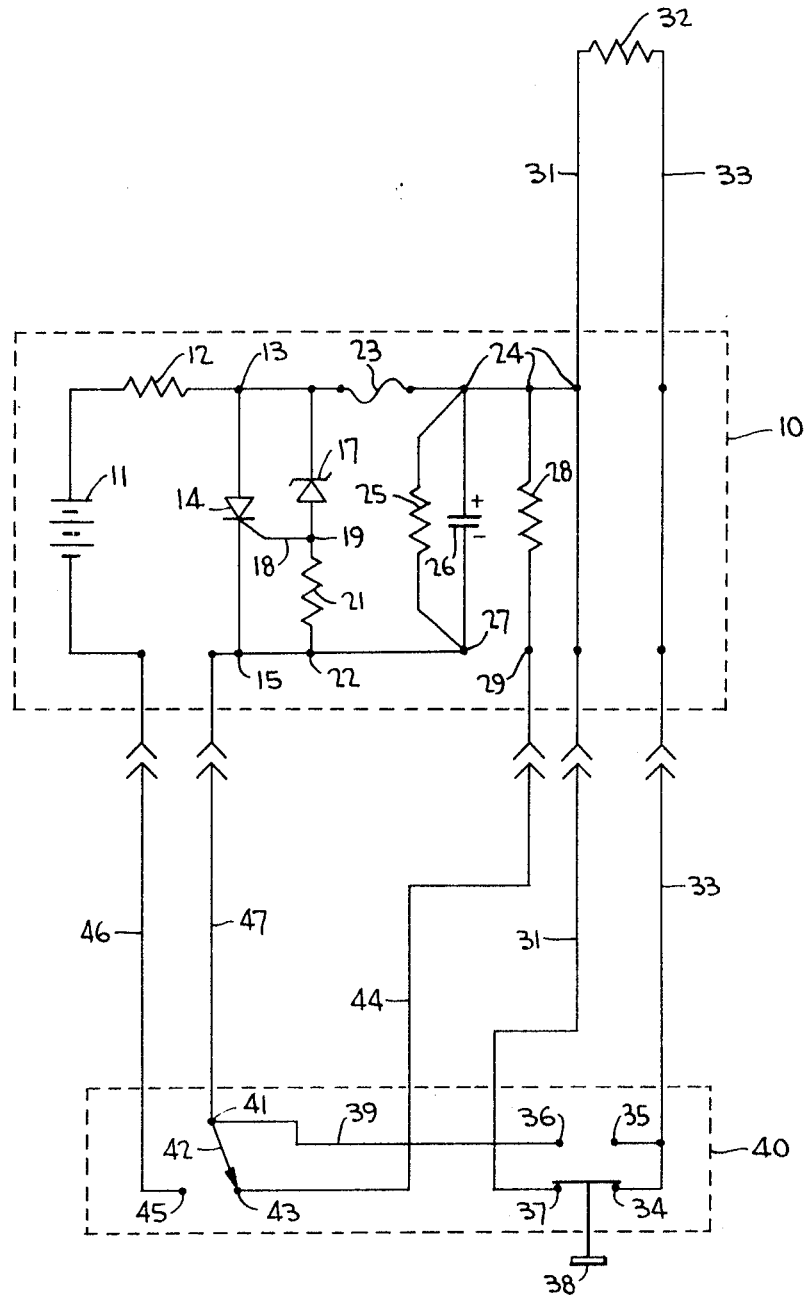

CAPACITIVE DISCHARGE FUZE

The invention described herein may be manufactured and used by or for the government of the United States of America for governmental purposes without the payment to me of any royalties thereon.

FIELD OF THE INVENTION

This invention is in the field of fuses that are safely armable and then operated or can be automatically disarmed and manually reset.

Description of the Prior Art

Kapp et al. U.S. Pat. No. 3,255,695; Bassie, U.S. Pat. No. 3,329,092, and Aulds et al. U.S. Pat. No. 3,343,403 are representative prior art but are consistent in lacking the ability to utilize a charging source that is rated higher than the capacitor to effect extremely short charging times. Kapp et al. is incapable of automatic separation of the charging and energy storage circuits nor does it discharge itself if not fixed. Aulds et al. also lacks the separation of the capacitor from the charging circuit when charged. All lack in the capability of being reset manually by the replacement of a fuse element.

SUMMARY

The time required to charge a capacitor is a function of the valve of the capacitance, the series resistance in the charging path and the potential applied by the charging source. In some applications, such as in an explosive embedment anchor fuse, the available arming time is shorter than could be achieved with previously known fuse circuits. Minimum charging times are accomplished by this invention by the utilization of a high voltage charging source. Capacitors suitable to store enough energy to detonate the charge controlled by this fuse can be rated lower than that which would with stand the full voltage of the charging source. System design considerations dictate that the capacitor voltage rating be the minimum required to perform the detonation function. This establishes a rating lower than the charging source voltage. In order to protect the capacitor, a Zener diode with a trigger level that is equal to the safe working voltage of the capacitor senses the voltage across the capacitor and triggers the silicon controlled rectifier to provide a short circuit in which a fusable element completely breaks the charging circuit and isolates the charged capacitor from the charging circuit.

In explosive embedment anchor fuse applications, it is desired for safety reasons that the explosive anchor not be armed in less than a minimum depth of water, such as twenty feet, for example. The rate of descent and the time required to arm determine the minimum depth at which the fuse will fire. The arming time for this invention has been made sufficiently short to insure detonation at the depth at which the anchor is intended to be embedded. In this application, a first switch is a pressure sensitive switch which is actuated at a predetermined depth and a second switch is a contact switch which is actuated when the anchor strikes the ocean floor. Further, the capacitor and the detonator are shorted prior to arming to prevent extraneous charge buildups from radio frequencies or chemical action.

These features result in a fuse that not only provides assured arming of a rapidly descending explosive embedment anchor for the safety of the floating vessel and its cargos but the explosive system is not armed until it has descended to a depth of at least twenty feet in water. Furthermore, once armed, this fuse is automatically disarmed over a predetermined period of time by discharging the capacitor through a resistive leakage path. Also, the simple task of replacing the melted fusing element in place thereof reconnects the charging source to the storage circuit, resetting the disarmed fuse to once more be armed when the pressure sensitive switch is actuate.

It is, therefore, an object of this invention to provide a fusing device in which a capacitor is rapidly charged to its maximum rated voltage by means of a battery of higher voltage without charging the capacitor above its maximum rating.

Another object of this invention is to provide a fuse that is not armed until it has descended to a safe depth of water.

Still another object of this invention is to provide a fuse mechanism in which both the detonator and the energy storage capacitor are short circuited prior to arming.

Yet another object of this invention is to provide a fuse which when once armed and then disabled, cannot be rearmed without manually resetting or replacing a fuse element in place thereof.

A further object of this invention is to provide a fuse in which detonation cannot occur unless the arming and firing switches are actuated in a preset timed sequence.

Still a further object of this invention is to provide a fuse which is automatically disarmed after a predetermined time if armed but not detonated.

Another object of this invention is to provide a fuse in which the energy storage device is isolated from the charging source once the fuse is armed.

The exact nature of this invention as well as other objects and advantages thereof will be readily apparent from consideration of the following specification relating to the annexed drawings in which:

BRIEF DESCRIPTION OF THE DRAWING

The FIGURE shows the fuse circuit of this invention.

DESCRIPTION OF A PREFERRED EMBODIMENT

Turning now to the drawing, a watertight metal housing 10, indicated by broken line, encloses circuitry including a power source 11 which can be a battery rated, for example, at 22½ volts, the positive terminal of which is connected to one side of a current limiting resistor 12 of approximately 10 ohms resistance. The other side of the resistor 12 is connected to a junction 13 to which is also connected to anode of a silicon controlled rectifier 14, the anode of a Zener diode 17 and one side of a fusable element 23. The fuse value can be 1 ampere, the SCR a 2N1771 and the Zener diode 116 volts. The cathode of SCR 14 is connected to a junction 15 to which are connected junctions 22 and 27 and a cable 47. The gate of SCR 14 is connected to the anode of Zener 17 at a junction 19 by a conductor 18. A current limiting resistor 21 is connected between junctions 19 and 22. Resistor 21 can have 1 watt and 470 ohm values. The other side of the fusable element 23 is connected to a junction 24. The positive side of a capacitor 26, of 45,000 mfd. value, is connected to junction 24 and the negative side thereof is connected to junction 27. A charge bleedoff resistor 25 is also connected between junctions 24 and 27. Since the value of resistance in resistor 25 determines the discharge time of the capacitor 26, a typical value could be 12,000 ohms, 1 watt. Connected between junction 24 and a junction 29 is current limiting resistor 28 with a typical value of 47 ohms, 1 watt.

The detonator 12 is connected by conductor 31 to junction 24 in the fuse circuit and by connector 33 to terminals 34 and 35 in the contact switch 38 housed with the pressure sensitive switch 42 in housing 40 which is attached to the embedment anchor structure. The detonator 32 is in the explosive mechanism that embeds the anchor 38, illustrated in the drawing as a double make, double break switch of the cross bar variety, is electrically connected to have a single pole, double-throw capability. Thus the switch, 38, in place thereof. The contact switch in its safe condition makes the conductive circuit connection between terminal 34 and terminal 37 which is connected to connector 31 to short circuit the detonator to prevent extraneous electrical pulses from activating the detonator. The contact switch 38 is actuated by a contact plunger, for example, upon striking the ocean floor to move the contact to connect terminal 35 to a terminal 36 which is connected by conductor 39 to a terminal 41 in the pressure sensitive switch which is also a single pole double throw switch 42. In its safe condition, the movable contact element of the pressure sensitive switch 42 is connected to a terminal 43 to which a connector 44 connects the pressure sensitive switch 42 to a terminal 43 to which a connector 47 to terminal 15 in the storage charging circuit. In its armed element 42 is in contact with a terminal 45 to which a conductor 46 the other end of which is connected to the negative terminal of the power source 11. In the safe condition of the pressure sensitive switch 42, capacitor 26 is shorted through bleedoff resistor 28.

OPERATION OF A PREFERRED EMBODIMENT

When the embedment anchor descends in water to a predetermined depth, twenty feet for example, the switch 42, in the pressure sensitive switch in housing 40 attached to the anchor, makes the conductive circuit connection which arms the charging circuit. Capacitor 26 is charged until the voltage reaches the break down voltage of the Zener diode 17 at which time the anode of the Zener provides the gate 18 of the silicon controlled rectifier 14 with a pulse that causes it to conduct. When the silicon controlled rectifier 14 conducts, two circuit paths are established. One is a simple battery discharge loop through SCR 14 and the other includes the capacitor 26, the SCR 14 and a fuse element 23 which immediately blows in response to the high current present in the charged capacitor circuit.

The capacitor 26 is left essentially fully charged and isolated from the battery circuit.

Descent of the anchor to a depth where the ground contact switch 38 makes the conductive circuit connection which connects terminals 35 and 36 to connect the charged capacitor 26 to the detonator 32. Firing of the detonator is accomplished.

If the capacitor 36 is charged and the contact switch 38 is not moved to the fire configuration, the charge on the capacitor is bled off through resistor 25 while the anchor is submerged far enough for the pressure sensitive switch to be in the arm configuration. If there is no firing and the anchor is raised in the water, the pressure sensitive switch 42 moves to terminal 43 and the capacitor is discharged through resistor 28.

Should the contact switch 38 makes the alternate conductive circuit connection (set to fire) before the pressure sensitive switch 42 makes the alternate conductive circuit connection (set to aim), the capacitor is not yet charged.

If the contact switch is first set to fire instead of the pressure switch, firing will not occur because of the current limiting capabilities of resistor 12. Resistor 12 will hold current in the battery path to a level lower than required to fire the detonator.

After one charge, the battery is permanently removed from the charging circuit because of the opening of fuse element 23. This permanence can be altered by manually replacement of the fuse element, not by any circuit nor switch operation.

So it is seen that I have provided a fuse for an explosive embedment anchor that meets the requirements of reliability and dependability that enable successful operation thereof. Since the time for charging the capacitor is very short- that is, the time for the descent of the heavy anchor from one rather short depth to another, and the capacitor must be limited as to rated value, this unique circuit provides assured safe operation of an embedment anchor fuse.

What I claim is:

1. In an explosive anchor fuse circuit;
   a power source means for producing a voltage output;
   capacitance means having a selected electrical energy storage capacity;
   means for connecting said power source means across said capacitance means including voltage limiting means, first switching means, and fuse element isolation means, said voltage limiting means adapted to limit the voltage applied across said capacitance means to a selected voltage level, said fuse element means adapted to isolate said capacitance means from said power source means when said voltage limiting means functions, said first switching means being an ambient condition pressure sensitive switching means having a single pole, double throw capability of making first and second conductive circuits, in alternate order, with said first conductive circuit of said first switching means constituting a part of said means for connecting said power source means across said capacitance means
   detonator means responsive to electrical current flow therethrough;
   means for connecting said capacitance means across said detonator means including second conductive circuit of said first switching means and second switching means, said second switching means being a contact switch means having a single pole, double throw capability of making first and second conductive circuits, in alternate order, with said first conductive circuit of said second switching means constituting a part of said means for connecting said capacitance means across said detonator means and;
   means connecting said second conductive circuit of said second switching means across said detonator means to provide an electrical short circuit thereacross when the last said second conductive circuit is made;
   said first switching means adapted to switch from making said first conductive circuit to making said second conductive circuit upon attainment of a selected ambient pressure level and;
   said second switching means adapted to switch from making said second conductive circuit to making said first conductive circuit upon activation by contact of said second switching means with a solid surface.